United States Patent Office 2,995,355
Patented Aug. 8, 1961

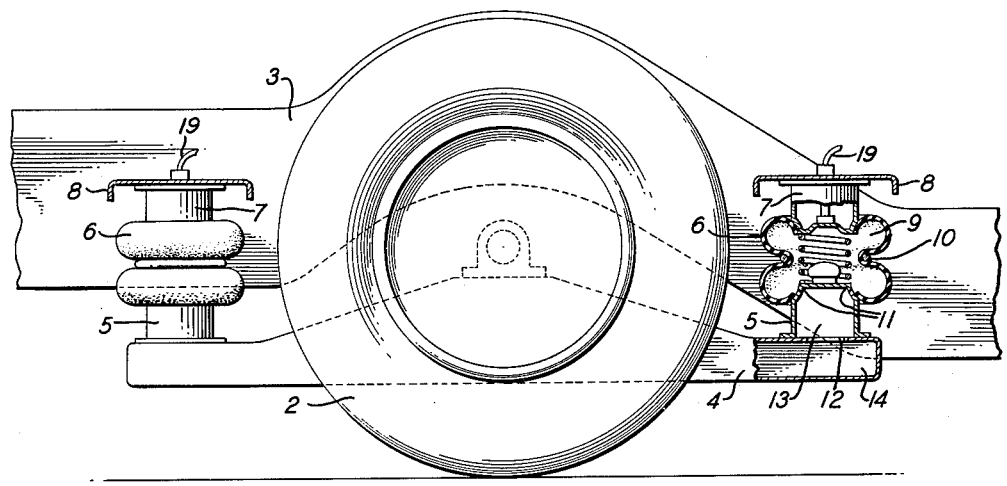
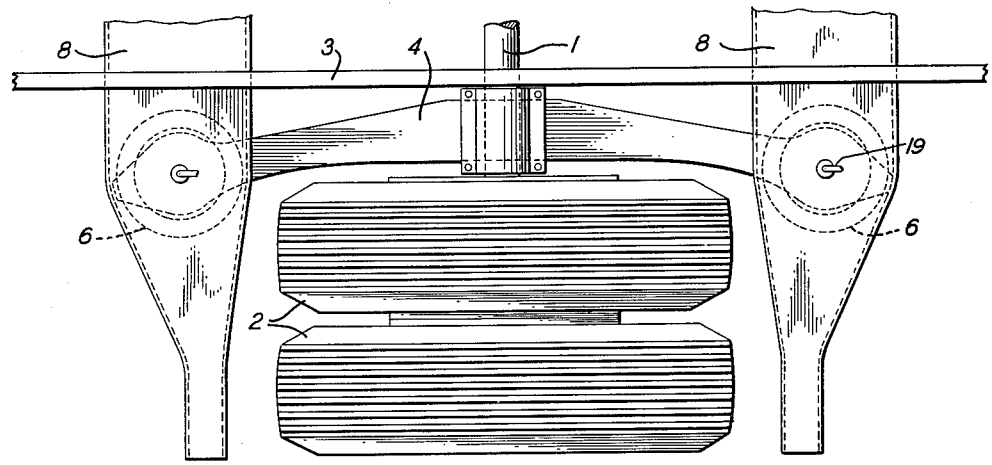

2,995,355
PNEUMATIC SPRING SYSTEM FOR MOTOR
VEHICLES, PARTICULARLY BUSES
Eugen Stump, Stuttgart-Unterturkheim, Germany, assignor to Daimler-Benz Aktiengesellschaft, Stuttgart-Unterturkheim, Germany
Filed Nov. 18, 1957, Ser. No. 697,216
Claims priority, application Germany Nov. 24, 1956
4 Claims. (Cl. 267—65)

The present invention relates to a pneumatic spring system for motor vehicles, particularly trucks and buses and the like, in which the wheel axle is rigidly connected on both sides of the vehicle to a scale-beam like support member disposed transversely to the wheel axle and which in turn is supported on each end thereof at the vehicle frame or the transverse beam members rigidly connected thereto through resilient pressurized air bellows that are pneumatically connected to rigid air reservoirs or tanks.

The present invention consists essentially therein that the scale-beam like support members are formed as hollow and air-tight bodies, the hollow portion of which is in communication with the pressure chambers of the air bellows mounted on these support members.

In order to obtain a soft spring action, particularly in connection with vehicles that are used for the transportation of passengers, such as buses, air bellows are known to be pneumatically connected with rigid air reservoirs or tanks in order to increase the total air volume in the system and to thereby provide a large spring deflection and avoid excessive pressures.

In contradistinction to arrangements in which, for instance, parts of the vehicle frame are formed as rigid air reservoirs or in which separate containers or tanks are attached to the frame, the present invention provides a particularly simple arrangement by constructing the scale-beam like support members as hollow, air-tight bodies which are in communication with the air bellows of the pneumatic springs. Such an arrangement results in a saving in the number of parts required and consequently in a saving in the dead-weight of the vehicle.

According to a further modification of the present invention, support elements of essentially cylindrical shape may be attached to the support members between the support members and the spring bellows to which one end thereof may be attached. Moreover, the support members, when viewed in a side elevation, may be of triangular shape and, when viewed in a plan view, may be bow- or arc-shaped to thereby partially surround the vehicle wheels adjacent thereto, so as to bring the vertical plane passing through the two air bellows as close as possible to a vertical plane passing through the vehicle wheels spring-supported by these two bellows.

Accordingly, it is an object of the present invention to provide a pneumatic spring system which is particularly suitable for heavy motor vehicles such as trucks and buses.

It is another object of the present invention to provide a pneumatic spring system in which certain structural members of the pneumatic spring system are formed as hollow bodies and are pneumatically connected with the interiors of the air bellows attached thereto.

A still further object of the present invention is to provide a pneumatic spring system in which the air bellows together with the hollow structural members form a large air chamber that assures a soft vehicle spring characteristic.

Another object of the present invention is to provide a pneumatic spring system which requires a minimum number of parts whereby assembly of the system is facilitated and a saving in dead-weight of the vehicle is attained.

These and further objects, features and advantages of the present invention will become more obvious from the following description when taken in connection with the accompanying drawing, which shows, for purposes of illustration only, one embodiment in accordance with the present invention and wherein:

FIGURE 1 is a side view of the pneumatic spring system in accordance with the present invention applied to the rear axle of a vehicle, and FIGURE 2 is a plan view of the arrangement of FIGURE 1.

Referring now to the drawing, wherein like reference numerals are used throughout the two views to designate like parts, and more particularly to FIGURES 1 and 2, reference numeral 4 designates therein a scale-beam like support member of which one each is attached on each side of the vehicle to the axle 1 in any conventional manner, and which are each disposed transversely to the rear axle 1 between the vehicle frame 3 and respective wheels 2, only one side of the vehicle being shown in FIGURE 2 for clarity's sake since the other side is identical therewith. The support members 4 are formed as hollow and air-tight bodies or structural members. When viewed from the side (FIGURE 1), the support members 4 are of essentially triangular shape, while, when viewed from the top (FIGURE 2), they are bow- or arc-shaped so that the ends thereof partially surround the vehicle wheels 2 adjacent thereto. A substantially cylindrical support element 5 is rigidly attached to each end of the support member 4, that is, on both sides of the rear axle 1, and the lower ends of the air bellows 6 are, in turn, attached to the upper ends of support element 5. The upper ends of the air bellows 6, on the other hand, are connected to support elements 7 which, in turn, are supported on the transverse frame members 8 which form part of the vehicle superstructure. The bottoms of the support elements 7 are sealed against the chambers 9 in the air bellows 6 to provide an air-tight seal at the upper side thereof, and the supply of air to bellows 6 is controlled by an elevation regulating valve of suitable construction, not shown. The air supply may enter the chambers 9 through a supply line 19 connected with a pump or tank. The upper closure surfaces of the lower support elements 5 are provided with holes or apertures 11 to establish a fluid communication between chambers 9 and the interior 13 of hollow support elements 5. Moreover, the ends of the support members 4 are provided with holes 12 arranged below the support elements 5 so that the chambers 9 in the air bellows 6, the chambers 13 in the support elements 5 and the chamber 14 in the support member 4, on each side of the vehicle, form together a combined air space having an air volume which is large enough to accommodate therein a sufficient quantity of air which assures a soft spring action of the vehicle. Furthermore, the volume of chamber 14 in the support member 4 is substantially larger than the volume of the chambers 9 in the air bellows 6.

The term "superstructure" is used herein to designate the frame, chassis or those parts of a self-supporting body against which the pneumatic springs support the wheels and wheel suspensions or axles.

While I have shown and described one preferred embodiment of a pneumatic spring system in accordance with the present invention, it is understood that the same is not limited thereto, but is susceptible of many changes and modifications within the scope of the present invention and I intend to cover all such changes and modifications as encompassed by the appended claims.

I claim:
1. A pneumatic spring system particularly for vehicles having a superstructure, comprising axle means, and means spring-supporting said axle means against said superstructure including a hollow support member rigidly connected to said axle means and constituting a scale- beam like structure of substantially triangular shape as viewed from the side thereof and essentially bow-shaped as viewed from the top thereof, hollow support elements provided with apertures and of substantially cylindrical shape attached to said hollow support members at each end thereof and at each side of said axle means, pneumatic spring means including a spring bellows each attached with one end thereof to a respective support element and with the other end thereof to said superstructure, means for supplying a pneumatic medium under pressure to said spring means, the interior of said hollow support members being in permanent communication with the interior of a respective one of said hollow support elements and of said spring means through said openings to form a relatively large fluid-tight volume for the pneumatic medium participating in the spring action to thereby obtain relatively large spring deflections at relatively low pressures.

2. A pneumatic spring system, particularly for heavy-duty vehicles having a superstructure, comprising axle means, hollow support members rigidly connected to said axle means at each end thereof comprising box-type wall portions forming a space within the members of substantially variable cross section, said hollow support members being so constructed and arranged as to partially surround the respective wheels adjacent thereto and constituting a scale-beam-like structure of substantially triangular shape as viewed from the side thereof and essentially bow-shaped as viewed from the top thereof, said hollow support members further being disposed substantially transversely to said axle means on both sides of said vehicle, hollow support elements attached to each of said hollow support members at each end thereof, and pneumatic spring means operatively connected to each end of said support members, each of said spring means being attached at one end thereof to a respective support element, the other end of said pneumatic spring means being attached to said superstructure, and the interior of said hollow support members being in permanent communication with the interior of said hollow support elements and said spring means to form therewith a relatively large fluid-tight space for the pneumatic medium to thereby assure soft spring action of said vehicle.

3. A pneumatic spring system particularly for vehicles having a superstructure, comprising axle means, hollow support members rigidly connected to said axle means at each end thereof, said hollow support elements comprising box-type wall portions forming a space within the members of substantially variable cross section, said hollow support members being so constructed and arranged as to partially surround the respective wheels adjacent thereto and constituting a scale-beam-like structure of substantially triangular shape as viewed from the side thereof and substantially bow-shaped as viewed from the top thereof, said hollow support members being disposed substantially transversely to said axle means at each end thereof, hollow support elements of substantially cylindrical shape provided with apertures, one of said support elements being attached to said hollow support members at each end thereof on each side of said axle means, a plurality of pneumatic spring means operatively connected with said support members at the ends thereof, each of said spring means including a spring bellows attached at one end thereof to a respective support element and, at the other end thereof, to said superstructure, and means for supplying a pneumatic medium under pressure to said spring means, the interior of said hollow support members being in communication with the interiors of said hollow support elements and of said spring means through said openings in said hollow support elements to form a closed reservoir of relatively large volume for the pneumatic medium to thereby assure soft spring action of said vehicle.

4. A pneumatic spring system particularly for vehicles having a superstructure including a pair of longitudinally-extending bearer members, comprising axle means, wheel means supported by said axle means at each end thereof, hollow support members rigidly secured to said axle means at each end thereof inside of said wheel means, said hollow support members comprising box-type wall portions forming a space within said members of substantially variable cross section, said hollow support members being so constructed and arranged as to partially surround the respective wheels adjacent thereto and constituting a scale-beam-like structure of substantially triangular shape as viewed from the side thereof and substantially bow-shaped as viewed from the top thereof, a plurality of hollow support elements of substantially cylindrical shape provided with apertures therethrough, a respective one of said hollow support elements being attached to each end of said hollow support members, a plurality of pneumatic spring means operatively connected with said support members, each of said spring means including a spring bellows attached at one end thereof to a respective support element and at the other end thereof to said longitudinally-extending bearer members, the interior of said hollow support members being in permanent communication with the interior of said hollow support elements and of said spring means through said openings to form a closed reservoir of relatively large volume for the pneumatic medium to thereby assure soft spring action of said vehicle, and means for supplying a pneumatic medium under pressure to said spring means, said hollow support members, hollow support elements and spring means being symmetrically arranged with respect to said axle means.

References Cited in the file of this patent

UNITED STATES PATENTS

| | | |
|---|---|---|
| 955,692 | Rhoads | Apr. 19, 1910 |
| 2,180,860 | Brown | Nov. 21, 1939 |
| 2,713,498 | Brown | July 19, 1955 |
| 2,787,475 | Jackson | Apr. 2, 1957 |
| 2,814,480 | Clark | Nov. 26, 1957 |
| 2,827,282 | Weiss | Mar. 18, 1958 |
| 2,903,256 | Weiss | Sept. 8, 1959 |